United States Patent
Markunas et al.

(10) Patent No.: US 7,884,581 B2
(45) Date of Patent: Feb. 8, 2011

(54) ACTIVE DAMPING FOR SYNCHRONOUS GENERATOR TORSIONAL OSCILLATIONS

(75) Inventors: Albert L. Markunas, Roscoe, IL (US); Vijay K. Maddali, Roscoe, IL (US)

(73) Assignee: Hamilton Sundstrand Corporation, Rockford, IL (US)

(*) Notice: Subject to any disclaimer, the term of this patent is extended or adjusted under 35 U.S.C. 154(b) by 0 days.

(21) Appl. No.: 12/875,760

(22) Filed: Sep. 3, 2010

(65) Prior Publication Data

US 2010/0327820 A1  Dec. 30, 2010

Related U.S. Application Data

(62) Division of application No. 11/824,659, filed on Jul. 2, 2007, now Pat. No. 7,808,215.

(51) Int. Cl.
*H02P 11/00* (2006.01)
*H02P 9/00* (2006.01)

(52) U.S. Cl. .......................... 322/44; 322/59

(58) Field of Classification Search .............. 322/44, 322/59, 29, 89, 17; 307/9.1
See application file for complete search history.

(56) References Cited

U.S. PATENT DOCUMENTS

| 2,282,874 | A | | 5/1942 | Moore et al. |
| 4,080,559 | A | | 3/1978 | Wright et al. |
| 4,377,780 | A | * | 3/1983 | Bjorklund ............... 322/29 |
| 4,463,306 | A | | 7/1984 | de Mello et al. |
| 4,625,160 | A | | 11/1986 | Hucker |
| 4,855,664 | A | | 8/1989 | Lane |
| 4,949,021 | A | * | 8/1990 | Rozman et al. ........ 318/400.11 |
| 5,047,699 | A | | 9/1991 | Rozman et al. |
| 5,132,894 | A | * | 7/1992 | Rozman et al. ............ 363/51 |
| 5,233,286 | A | | 8/1993 | Rozman et al. |
| 5,698,968 | A | | 12/1997 | Takagi et al. |
| 5,977,731 | A | | 11/1999 | Xia et al. |
| 6,337,561 | B1 | | 1/2002 | Sudou et al. |
| 6,903,529 | B2 | | 6/2005 | Künzel et al. |
| 7,173,399 | B2 | | 2/2007 | Sihler et al. |
| 7,283,899 | B1 | | 10/2007 | Harmon et al. |
| 7,557,544 | B2 | | 7/2009 | Heinz et al. |

(Continued)

FOREIGN PATENT DOCUMENTS

EP  0239806 A1  7/1987

OTHER PUBLICATIONS

Anderson et al., "Power System Control and Stability," pp. 338, 339, 363-365; IEEE Press.

*Primary Examiner*—Julio Gonzalez
(74) *Attorney, Agent, or Firm*—Kinney & Lange, P.A.

(57) ABSTRACT

A generator control unit (GCU) provides active damping of a synchronous generator by monitoring the speed of the synchronous generator and detecting oscillations in the monitored speed. The oscillations are indicative of torsional oscillations within the mechanical drivetrain including the synchronous generator or generators. In response to detected oscillations in the monitored speed, the GCU generates a varying set-point value that is used to control the excitation voltage provided to the synchronous generator. Varying the excitation voltage provided to the synchronous generator causes a variation in synchronous generator torque. By selectively varying the torque in the synchronous generator, the GCU provides active damping in the synchronous generator that decreases or dampens the torsional oscillations.

13 Claims, 3 Drawing Sheets

U.S. PATENT DOCUMENTS

2006/0244425 A1  11/2006  Sihler
2009/0021208 A1   1/2009  Romenesko et al.
2010/0019739 A1   1/2010  Rittiger

* cited by examiner

ACTIVE DAMPING FOR SYNCHRONOUS GENERATOR TORSIONAL OSCILLATIONS

BACKGROUND

The present invention relates to synchronous generators, and in particular to active damping of synchronous generators.

Synchronous generators are used in a variety of applications to convert mechanical energy provided by an engine to alternating current (AC) electrical energy. In particular, synchronous generators are used in applications such as aboard aircraft to generate the AC electrical energy necessary to support on-board electrical systems.

In a typical topology, an engine generates mechanical energy that is provided through a gearbox to a synchronous generator or to multiple synchronous generators. A shaft transmits the mechanical energy from the gearbox to the synchronous generator. Due to a multitude of competing mechanical design considerations, the shaft may be relatively long and mechanically compliant. The inertias associated with the engine, the gearbox, the synchronous generator, and other gearbox driven accessories in combination with the mechanical compliance or spring rates of the mechanical drivetrain, including the generator shaft, create a distributed mechanical spring-mass system that has associated torsional resonances. There are multiple torsional modes and associated resonances that involve the generators for multiple direct-driven generators on a common gearbox. Engine gearboxes typically exhibit very lightly damped characteristics, and because the synchronous generator is controlled to maintain an AC voltage, it presents a near constant power load characteristic to the mechanical drivetrain that results in negative damping for disturbance frequencies that are within the generator's voltage regulation bandwidth. In certain situations, depending on the generator speed, the generator electrical load, and the net effective damping in the overall mechanical drivetrain, the torsional resonance of the spring-mass system involving the generator or generators can lead to large, undesirable torsional oscillations and mechanical failures in the system. Mechanical damping may be used to offset the negative damping characteristic of the synchronous generator or generators and thus dampen the torsional oscillations in the spring-mass system, but mechanical damping requires additional parts that increase the weight and cost of the system.

SUMMARY

A controller for a generator provides active damping by monitoring the speed of the generator and detecting oscillations in the monitored speed that indicate the presence of torsional oscillations. In response to detected oscillations in the monitored speed, the controller dynamically varies a set-point associated with the generator. Varying the set-point results in variation of the torque in the synchronous generator that dampens or decreases the torsional oscillations within the generator.

DETAILED DESCRIPTION

A synchronous generator is controlled by a generator control unit in order to maintain a constant value output voltage despite changing electrical loads and gradual increases and decreases in the speed of the generator associated with normal engine operation. In general, the generator control unit regulates the output voltage of the synchronous generator by controlling an excitation voltage provided to the synchronous generator. In addition, the generator control unit controls the excitation voltage provided to the synchronous generator to provide active damping to the mechanical system including the synchronous generator. The generator control unit provides active damping by monitoring the speed associated with the synchronous generator and detecting oscillations within the monitored speed that are indicative of torsional oscillations. In response to the detected oscillations, the generator control unit dynamically modifies the excitation voltage provided to the synchronous generator such that the torque associated with the generator is selectively varied. By selectively varying the torque in proper phase relationship to the generator speed oscillations the generator provides active or positive damping that dampens or reduces the torsional oscillations in the generator. A benefit of using electrical means to provide damping (as opposed to mechanical means) is no additional hardware or mechanical components are required.

Figure 1:
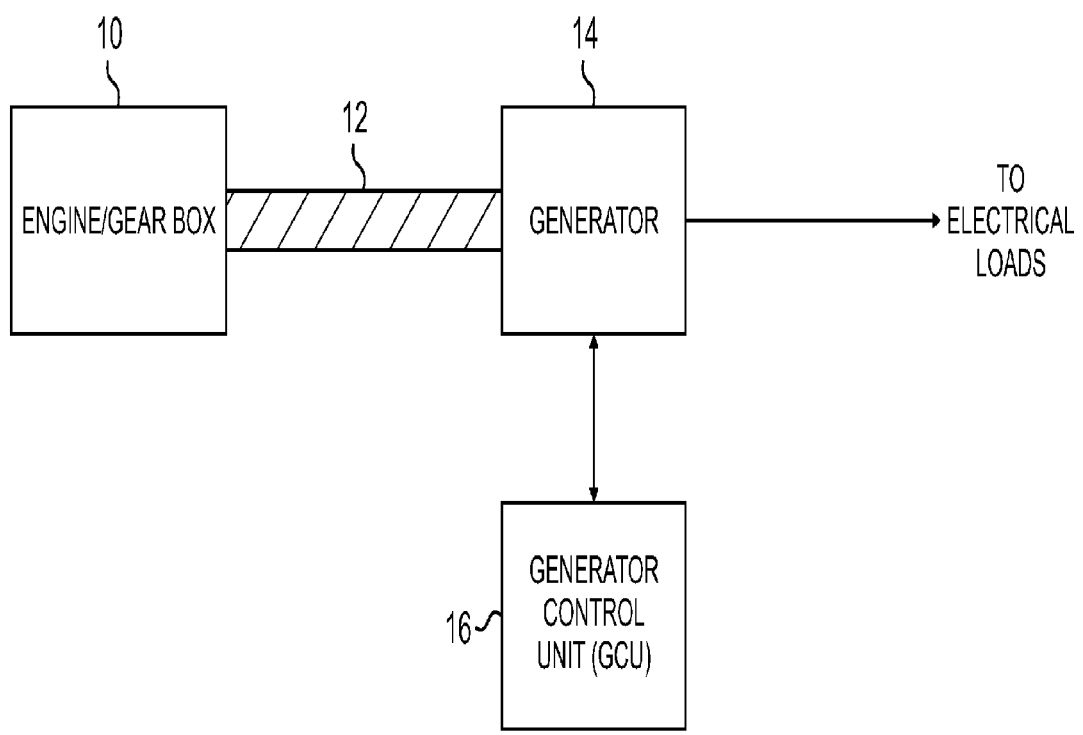
FIG. 1 is a block diagram illustrating a system that includes an engine/gearbox connected to provide power to a synchronous generator and a generator control unit connected to control the output voltage of the generator as well as provide active damping to the system.

FIG. 1 illustrates a system for converting mechanical energy to electrical energy. Components included within the system include engine/gearbox 10, shaft 12, synchronous generator 14, and generator control unit (GCU) 16. Engine/gearbox 10 generates mechanical energy using any number of well-known methods. In addition, although it is common in direct-driven systems to include a gearbox to scale the speed provided by engine 10, mechanical energy may be provided to synchronous generator 14 in a variety of ways.

Shaft 12 transmits mechanical energy provided by engine/gearbox 10 to synchronous generator 14. Based on the mechanical energy provided by engine/gearbox 10, synchronous generator 14 generates an electrical output that is provided to one or more electrical loads. To maintain a desired output voltage, GCU 16 monitors the output voltage of synchronous generator 14 and regulates an excitation voltage provided to synchronous generator 14. In an exemplary embodiment, GCU 16 is programmed with a voltage set-point that defines the desired output root mean square (rms) voltage of synchronous generator 14. In this way, GCU 16 maintains the rms value of the output voltage of synchronous generator 14 at a desired value as determined by the voltage set-point.

The system including engine/gearbox 10, shaft 12 and synchronous generator 14 form a spring-mass system that has the potential to generate torsional oscillations. In addition to controlling the output of synchronous generator 14 by controlling the magnitude of the excitation voltage provided to synchronous generator 14, GCU 16 also provides active or positive damping of synchronous generator 14. As discussed in more detail with respect to FIGS. 2 and 3, GCU 16 provides positive damping by varying the voltage set-point such that the torque of synchronous generator 14 is selectively varied at the same frequency as the detected torsional oscillations, creating a varying torque that acts to dampen torsional oscillations in synchronous generator 14.

Figure 2:
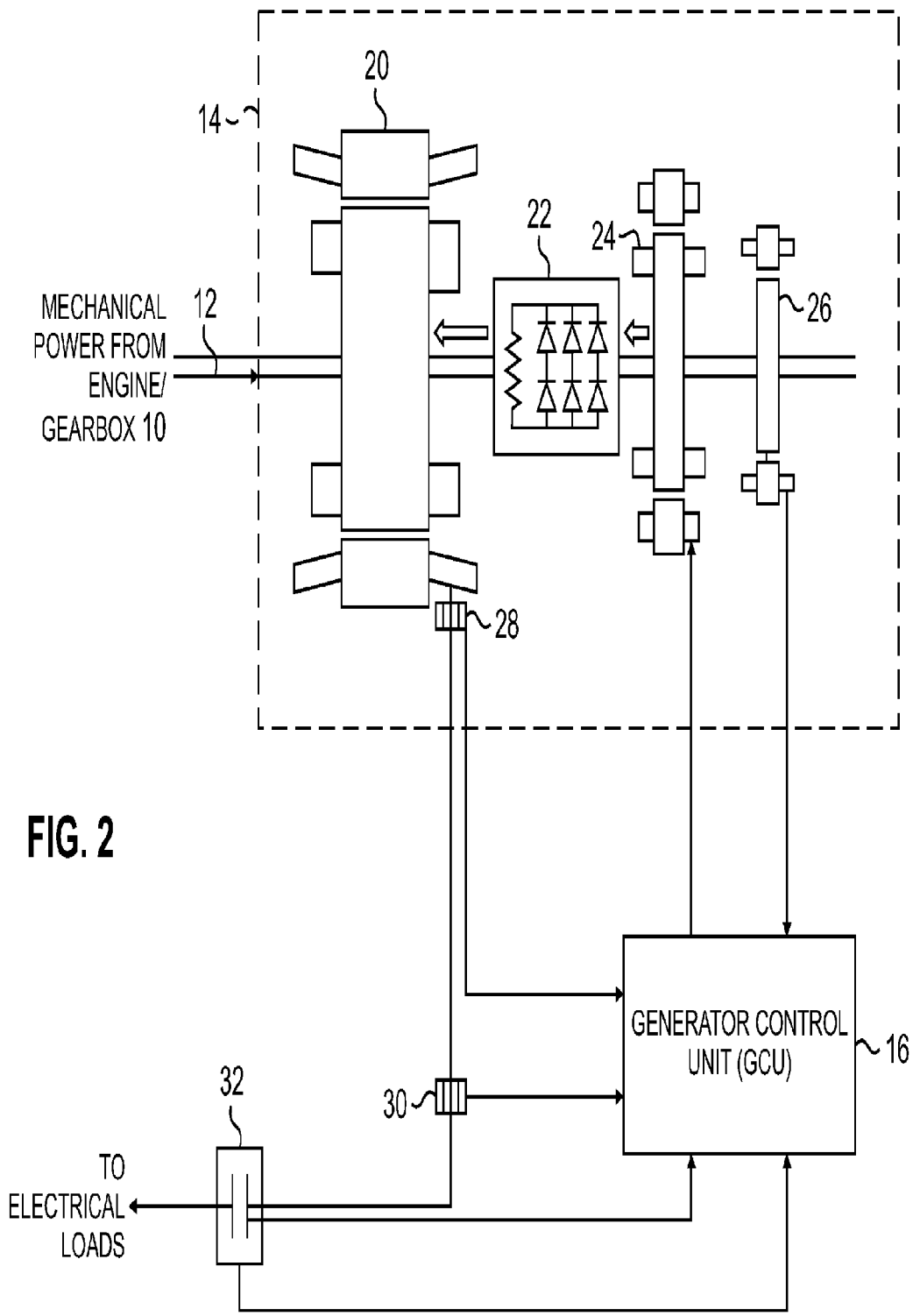
FIG. 2 is a block diagram illustrating in more detail the connection of the synchronous generator to the generator control unit.

FIG. 2 shows an embodiment of connections between synchronous generator 14 and GCU 16. In this embodiment, synchronous generator 14 includes main synchronous generator 20, rotating rectifier assembly 22, exciter 24, permanent magnet generator (PMG) 26, and current transformers 28. Main synchronous generator 20, exciter 24, and PMG 26 are each connected to receive mechanical energy from shaft 12. In response to mechanical energy provided by shaft 12, PMG 26 generates a 3-phase alternating current (AC) output voltage that is provided to GCU 16. Circuitry included within GCU 16 rectifies the 3-phase AC voltage to a direct current (DC) value and then regulates the DC value to a desired magnitude that is provided as an excitation voltage to exciter 24. GCU 16 regulates the magnitude of the excitation voltage based on monitoring the output 3-phase AC voltage generated by main synchronous generator 20 (as measured at line contactor 32) and the voltage set-point. In response to mechanical energy provided by shaft 12 and the magnitude of the excitation voltage provided by GCU 16, exciter 24 generates a 3-phase AC output voltage that is provided to rotating rectifier assembly 22, which rectifies the 3-phase AC voltage and provides the resulting DC voltage as an excitation voltage to main synchronous generator 20. In response to the mechanical energy provided by shaft 12, and the excitation voltage provided by exciter 24, main synchronous generator 20 generates a 3-phase AC output voltage that is provided through generator current transformer 28 and line current transformers 30 to line contactor 32. GCU 16 therefore monitors the 3-phase AC output voltage generated at line contactor 32 (as well as the line current in some instances) and controls the DC excitation voltage provided to exciter 24 such that the rms value of the 3-phase AC output voltage at line contactor 32 is maintained at a desired value (i.e., the voltage set-point value).

To provide active damping to synchronous generator 14, GCU 16 must first detect the presence of torsional oscillations. By measuring the speed of synchronous generator 14 and detecting oscillations within the measured speed the presence of torsional oscillations may be detected. In an exemplary embodiment, oscillations are detailed within a frequency range that is characteristic of the mechanical torsional resonances that are present in the particular mechanical drivetrain. In the embodiment shown in FIG. 2, GCU 16 is able to detect the presence of torsional oscillations by indirectly measuring the speed of synchronous generator 14 based on the AC output voltage provided by PMG 26. That is, the frequency of the AC voltage provided by PMG 26 is directly related to the speed at which PMG 12 rotates.

In other embodiments, rather than indirectly measure the speed associated with synchronous generator 14 based on the AC output voltage, other methods of measuring the speed associated with synchronous generator 14 may be employed. In an exemplary embodiment, an observer structure that includes a model of synchronous generator 14 may be employed. For example, in one embodiment the observer structure is implemented with a Luenberger observer that generates a speed estimate for synchronous generator 14 based on sensed terminal voltage currents and voltages. In general, the Luenberger observer monitors changes in the voltage in response to changes in generator speed, and includes a model for generating a predicted or estimated voltage. The monitored voltage and the estimated voltage are compared to generate an estimate of actual generator speed. In addition, the Luenberger observer makes use of current measurements to account for changes in the output voltage caused by variations in the load (as opposed to variations caused by torsional oscillations). In this way, the Luenberger observer provides an alternative method of sensing generator speed. In another embodiment, the observer structure may be implemented with a Kalman filter that estimates the speed of the generator. In still other embodiments, a speed sensor or equivalent device may be used to directly observe or measure the speed associated with synchronous generator 14.

In the embodiment shown in FIG. 2, detected oscillations within the measured speed are indicative of torsional oscillations. In particular, torsional oscillations cause the speed of synchronous generator 14 to vary in an approximate sine wave fashion about the average speed at a certain frequency (e.g., 40 Hertz (Hz)). For example, if the average speed of synchronous generator 14 is 10,000 revolutions per minute (RPM), then torsional oscillations may result in the shaft speed increasing to 10,100 RPM and decreasing to 9,900 RPM at a frequency of 40 Hz. In response to detected torsional resonant frequency oscillations in the speed of synchronous generator 14, GCU 16 responds by varying the voltage set-point (e.g., the value representing the desired rms value of the AC output voltage of synchronous generator 14) to actively dampen the torsional oscillations. Specifically, GCU 16 increases and decreases the voltage set-point at the frequency of the torsional oscillations. In the above example, GCU 16 varies the set-point at a frequency of 40 Hz, and increases the set-point above the nominal value when the torsional oscillations cause the speed of synchronous generator 14 to increase above the average speed, and decreases the set-point below the nominal value when the torsional oscillations cause the speed of synchronous generator 14 to decrease below the average speed. Increasing the voltage set-point causes the mechanical torque of synchronous generator 14 to increase. Likewise, decreasing the voltage set-point causes the mechanical torque of synchronous generator 14 to decrease. Varying the torque of synchronous generator 14 at the same frequency and in correct phase with the torsional oscillations results in synchronous generator 14 providing active or positive damping that reduces or dampens the torsional oscillations in the mechanical drivetrain.

Figure 3:
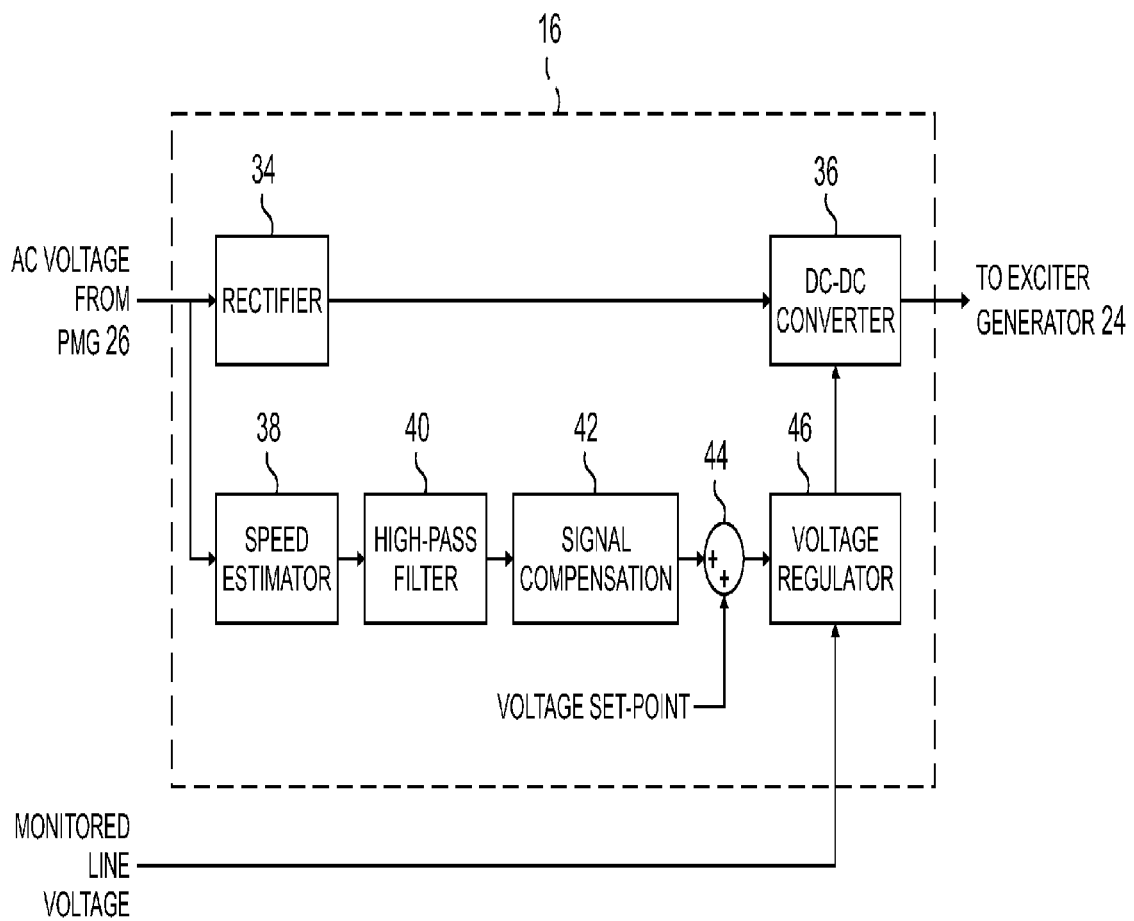
FIG. 3 is a block diagram illustrating functions performed by the generator control unit to provide active damping to the system.

FIG. 3 illustrates an exemplary embodiment of the functional operations performed by GCU 16 to provide active damping of synchronous generator 14. In this embodiment, GCU 16 is implemented by a microprocessor or digital signal processor (DSP) that performs the functions illustrated in FIG. 3 using a combination of software and hardware components. In other embodiments, the functions illustrated in FIG. 3 are implemented using analog devices. In addition, functional operations shown in FIG. 3 are limited to those functions related to providing active damping to synchronous generator 14. In other embodiments, GCU 16 may include additional functionality beyond those functions illustrated in FIG. 3.

As shown in FIG. 3, GCU 16 includes rectifier 34, DC-DC converter 36, speed estimator 38, high-pass filter 40, signal compensation 42, summer 44, and voltage regulator 46. Rectifier 34 rectifies the AC output voltage generated by PMG 26 (as shown in FIG. 2) to a DC voltage that is provided to DC-DC converter 36. In the situation in which no torsional oscillations are detected, voltage regulator 46 acts to control the magnitude of the DC output voltage generated by DC-DC converter 36 based on the voltage set-point value and the monitored output voltage generated by main synchronous generator 20 (as measured at line contactor 32 shown in FIG. 2). By selectively increasing or decreasing the output voltage generated by DC-DC converter 36 the output voltage generated by main generator 20 can be selectively controlled to a desired level. The operations performed by GCU 16 illustrate a simple model used to maintain the output voltage of main synchronous generator 20 at a desired level. In other embodiments, more complex algorithms and additional inputs may be used to control the output voltage of main synchronous generator 20.

In addition, the AC output voltage generated by PMG 26 is provided to speed estimator 38. Because the signal provided by PMG 26 is an alternating current signal with a frequency that is directly related to the speed of PMG 26, speed estimator 38 is able to determine the actual speed of PMG 26, and thus the speed of synchronous generator 14, based on the zero-crossings (i.e., the frequency with which the AC output voltage crosses the value zero). For instance, in an exemplary embodiment, speed estimator 38 includes a high-frequency clock that measures the period between successive zero crossings of the AC output voltage of PMG 26. Measuring the period between successive zero crossings allows speed estimator 38 to estimate the actual speed of synchronous generator 14. In addition, to ensure accuracy in estimating the speed of synchronous generator 14, the speed estimator may average successive cycles together in order to account for electromechanical asymmetries in the design of PMG 26. For instance, PMG 26 may include a number of permanent magnets that are spaced very nearly, but not exactly equal, relative to one another. Averaging the estimated speed over several successive cycles provides a more accurate estimate of the actual speed of synchronous generator 14. In other embodiments an actual speed sensor may be employed to monitor the speed of synchronous generator 14 and provide an input to GCU 16 reflecting the measured speed.

The monitored speed of synchronous generator 14 is provided to high-pass filter 40, which detects oscillations associated with the speed of synchronous generator 14. As discussed above, the presence of oscillations in the speed of synchronous generator 14 is indicative of torsional oscillations. For example, if torsional oscillations exist on synchronous generator 14, such that the speed of synchronous generator 14 oscillates between 9,900 RPM and 10,100 RPM at a frequency of 40 Hz, then high pass filter 40 isolates the 40 HZ oscillation within the measured speed. In this way, DC variations in the speed of synchronous generator 14 (such as those caused by variations in the mechanical energy generated by engine 10) are filtered out, with only the oscillations indicative of torsional oscillations being provided to signal compensator 42.

The torsional oscillations detected within synchronous generator 14 are provided to signal compensator 42, which provides dynamic compensation and scaling of the oscillations. In particular, signal compensator 42 modifies the phase of the torsional oscillations to counteract delays in measuring and processing the speed oscillation signal. For instance, in the embodiment described above in which speed estimator 38 averages speed estimates provided over several cycles of data, the delay caused in estimating the speed of synchronous generator 14 is compensated for by signal compensator 42. In this way, signal compensator 42 ensures that the signal ultimately provided to voltage regulator 46 is properly phased such that GCU 16 provides active damping (i.e., the variations in generator torque are properly phased to dampen torsional oscillations).

Signal compensator 42 also provides scaling to the torsional oscillations provided by high-pass filter 40. The scaling provided by signal compensator 42 ensures that the magnitude of the signal added to the voltage set point by adder 44 is properly scaled to provide adequate active damping. Generally speaking, the magnitude of the torsional oscillation signal added to the voltage set-point must be kept comparatively small (relative to the voltage set-point), such that adding the torsional resonant frequency oscillation signal to the voltage set-point does not cause the output voltage of main synchronous generator 20 to increase or decrease beyond defined tolerances. In this way, the output of main synchronous generator 20 is still maintained at a relatively constant value (as required by electric power quality specifications) but torsional oscillations within synchronous generator 14 and shaft 12 are damped or reduced.

The resulting signal generated as a result of adding the scaled, compensated torsional oscillation signal to the voltage set-point results in a varying voltage set-point value being provided to voltage regulator 46. In addition, monitored line voltage representing the output voltage of main generator 20 is also provided to voltage regulator 46. Based on these inputs, voltage regulator 46 generates a duty cycle signal that is provided to DC-DC converter 36. In particular, the variation of the voltage set-point caused by the addition of the torsional oscillation signal results in voltage regulator 46 introducing an oscillating component to the excitation voltage generated by DC-DC converter 36. The ramping voltage set-point results in a generator torque varying at the same frequency as the detected torsional oscillations. The varying generator torque, if maintained at the proper phase relative to the speed oscillations of synchronous generator 14, dampens or decreases the torsional oscillations in synchronous generator 14.

Thus, GCU 16 monitors the speed of synchronous generator 14, and isolates within the monitored speed oscillations indicative of torsional resonance. The torsional oscillation component of the measured speed is scaled and phase compensated such that the resulting value can be added to the voltage set-point to generate active damping within generator 12. Specifically, as the monitored speed increases (i.e., the torsional oscillation component of the monitored speed increases as part of the approximate sine wave oscillation) the resulting set-point value provided to voltage regulator 46 is increased such that increased torque is generated within synchronous generator 14. Likewise, as the monitored speed decreases (i.e., the torsional oscillation component of the monitored speed decreases as part of the approximate sine wave oscillation) the resulting set-point value provided to voltage regulator 46 is decreased such that synchronous generator 14 torque is decreased. By varying torque associated with generator 14 at the same frequency as the detected oscillations, synchronous generator 14 provides active damping that decreases the torsional oscillations in the mechanical drivetrain.

Although the present invention has been described with reference to preferred embodiments, workers skilled in the art will recognize that changes may be made in form and detail without departing from the spirit and scope of the invention.

The invention claimed is:

1. A method of providing active damping to a generator, the method comprising:
   monitoring speed associated with the synchronous generator;
   detecting oscillations within the monitored speed; and
   varying an excitation voltage provided to the synchronous generator based, in part, on the detected oscillations in the speed of the synchronous generator, wherein the excitation voltage is varied at a frequency that is based on the frequency of the detected oscillations.
2. The method of claim 1, wherein monitoring the speed of the synchronous generator includes:

receiving input from a speed sensor connected to monitor speed associated with the synchronous generator.

3. The method of claim 1, wherein monitoring the speed of the synchronous generator includes:

monitoring an alternating current (AC) voltage generated by the synchronous generator;

detecting a frequency associated with the monitored AC voltage; and estimating the speed of the synchronous generator based on the frequency of the monitored AC voltage.

4. The method of claim 1, wherein monitoring the speed of the synchronous generator includes:

monitoring a terminal voltage associated with the synchronous generator;

monitoring a terminal current associated with the synchronous generator;

generating an estimated terminal voltage based on a model of the synchronous generator; and determining the speed associated with the synchronous generator based on the terminal voltage, the terminal current and the estimated terminal voltage.

5. The method of claim 1, wherein detecting oscillations within the monitored speed includes:

providing the monitored speed to a high-pass filter that isolates the torsional oscillations within the monitored speed.

6. The method of claim 1, wherein varying an excitation voltage provided to the synchronous generator based, in part, on the detected torsional oscillations in the speed of the synchronous generator includes:

providing phase compensation to the isolated torsional oscillations to compensate for time delays in monitoring the speed associated with the synchronous generator;

adding the phase compensated torsional oscillation signal to a voltage set-point to generate a varying voltage set-point value; and varying the excitation voltage provided to the synchronous generator based on the varying voltage set-point value.

7. A controller for providing active damping to a system that includes a synchronous generator, the controller comprising:

a speed sensing circuit that measures a speed of the synchronous generator;

a detection circuit that detects torsional oscillations in the measured speed of the synchronous generator; and a voltage regulator circuit that varies an excitation voltage provided to the synchronous generator based, in part, on the detected torsional oscillations in the speed of the synchronous generator, wherein the voltage regulator circuit varies the excitation voltage at a frequency equal to the frequency of the detected torsional oscillations.

8. The controller of claim 7, wherein the speed sensing circuit is connectable to receive speed measurement data from a speed sensor connected to monitor speed of the synchronous generator.

9. The controller of claim 7, wherein the speed sensing circuit is connectable to monitor an alternating current (AC) voltage generated by the synchronous generator, wherein the speed sensing circuit indirectly measures the speed of the synchronous generator based on a measured frequency of the monitored AC voltage.

10. The controller of claim 7, wherein the speed sensing circuit is connectable to monitor an AC voltage and an AC current generated by the synchronous generator, wherein the speed sensing circuit includes a Luenberger observer that measures the speed of the synchronous generator based on the monitored AC voltage and AC current.

11. The controller of claim 7, wherein the detection circuit includes:

a high-pass filter circuit that isolates the torsional oscillations in the measured speed of the synchronous generator.

12. The controller of claim 11, further including:

a signal compensation circuit that adds phase compensation to the torsional oscillations to ensure the varying voltage set-point is properly phased to provide active damping.

13. The controller of claim 12, further including:

a summing circuit that generates a varying voltage set-point value based on the torsional oscillations provided by the signal compensation circuit and a constant voltage set-point that represents a desired output voltage of the synchronous generator; and a voltage regulator that controls the excitation voltage provided to the synchronous generator based on the varying voltage set-point value.

\* \* \* \* \*